(12) United States Patent
Wang et al.

(10) Patent No.: US 9,195,905 B2
(45) Date of Patent: Nov. 24, 2015

(54) METHOD AND SYSTEM FOR GRAPH BASED INTERACTIVE DETECTION OF CURVE STRUCTURES IN 2D FLUOROSCOPY

(75) Inventors: Peng Wang, Princeton, NJ (US); Wei-shing Liao, Taipei (TW); Terrence Chen, Princeton, NJ (US); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 947 days.

(21) Appl. No.: 13/041,818

(22) Filed: Mar. 7, 2011

(65) Prior Publication Data
US 2011/0221754 A1  Sep. 15, 2011

Related U.S. Application Data

(60) Provisional application No. 61/312,373, filed on Mar. 10, 2010.

(51) Int. Cl.
| | |
|---|---|
| G06K 9/46 | (2006.01) |
| G06T 11/20 | (2006.01) |
| G06K 9/68 | (2006.01) |
| G06T 7/00 | (2006.01) |

(52) U.S. Cl.
CPC .............. *G06K 9/469* (2013.01); *G06K 9/6892* (2013.01); *G06T 11/203* (2013.01); *G06T 11/206* (2013.01); *G06T 7/0083* (2013.01); *G06T 2207/10121* (2013.01); *G06T 2207/10124* (2013.01); *G06T 2207/30021* (2013.01)

(58) Field of Classification Search
None
See application file for complete search history.

(56) References Cited

U.S. PATENT DOCUMENTS

| | | | |
|---|---|---|---|
| 8,125,493 B2 * | 2/2012 | Wexler et al. ................. | 345/582 |
| 2006/0034194 A1 * | 2/2006 | Kahan ............................ | 370/255 |
| 2007/0270692 A1 | 11/2007 | Barbu et al. | |
| 2008/0025222 A1 * | 1/2008 | Nikolova et al. .............. | 370/238 |
| 2008/0080754 A1 | 4/2008 | Barbu et al. | |
| 2009/0175171 A1 * | 7/2009 | Nikolova et al. .............. | 370/238 |
| 2009/0279767 A1 | 11/2009 | Kukuk et al. | |
| 2010/0121181 A1 | 5/2010 | Wang et al. | |

OTHER PUBLICATIONS

Merriam Webster Dictionary, http://www.merriam-webster.com/dictionary, pp. 6.*

* cited by examiner

*Primary Examiner* — Jwalant Amin

(57) ABSTRACT

A method and system for detecting a curve structure in a 2D fluoroscopic image is disclosed. A plurality of curve segments are detected in the image. A graph is generated based on the detected curve segments. A curve structure is detected in the image by determining a path between a source node and a destination node in the graph. A hyper-graph can be constructed from the graph in order to impose geometric constraints on segments of the detected the curve structure, and the curve structure can be detected by finding a shortest path in the hyper-graph.

29 Claims, 7 Drawing Sheets

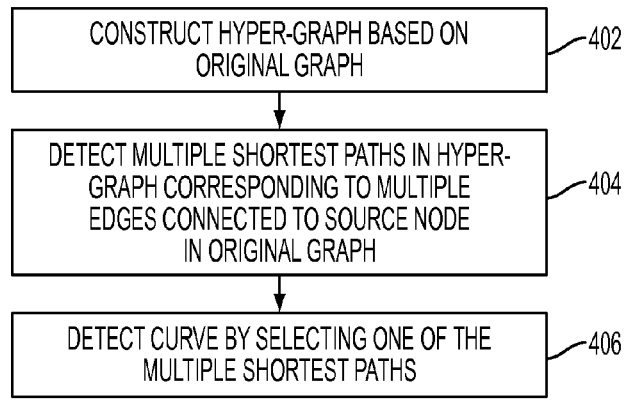

```
          ┌─────────────────────────────────┐
          │  CONSTRUCT HYPER-GRAPH BASED ON │──402
          │         ORIGINAL GRAPH          │
          └─────────────────────────────────┘
                          ↓
          ┌─────────────────────────────────┐
          │ DETECT MULTIPLE SHORTEST PATHS  │
          │   IN HYPER-GRAPH CORRESPONDING  │──404
          │   TO MULTIPLE EDGES CONNECTED   │
          │  TO SOURCE NODE IN ORIGINAL     │
          │              GRAPH              │
          └─────────────────────────────────┘
                          ↓
          ┌─────────────────────────────────┐
          │  DETECT CURVE BY SELECTING ONE  │──406
          │   OF THE MULTIPLE SHORTEST PATHS│
          └─────────────────────────────────┘
```

FIG. 4A

- GIVEN THE ORIGINAL GRAPH G, THE SOURCE NODE $n_s$, AND THE DESTINATION NODE $n_d$
- CONSTRUCT A HYPER-GRAPH $G_H$
  452 ⎰ 1. SET EACH EDGE IN G AS A HYPER-NODE IN $G_H$, AND COPY THE EDGE COST IN G AS A
      ⎨    NODE COST IN $G_H$
      ⎩ 2. CONNECT TWO HYPER-NODES IF THEY SHARE A NODE IN G, AND COMPUTE THE HYPER-
           EDGE COST AS IN EQN. (3)
- FIND THE SHORTEST PATH IN THE HYPER-GRAPH $G_H$
  454 ⎰ 1. GET A SET OF EDGES $\{e_{i,s}\}$ THAT CONNECT TO $n_s$ IN G, AND A SET OF EDGES $\{e_{j,d}\}$
      ⎨    THAT CONNECT TO $n_d$ IN G.
      ⎨ 2. COMPUTE A BUNDLE OF SHORTEST DISTANCE. EACH SHORTEST DISTANCE IS FOR A PAIR
      ⎨    OF HYPER-NODES IN $G_H$. ONE HYPER-NODE CORRESPONDS TO ONE OF $\{e_{i,s}\}$, AND THE
      ⎩    OTHER CORRESPONDS TO ONE OF $\{e_{j,d}\}$
  456 ⎰ 3. SELECT THE OPTIMAL PATH FROM ALL THE BUNDLE OF SHORTEST PATHES
      ⎩ 4. MAP THE SHORTEST PATH IN $G_H$ BACK TO THE ORIGINAL PATH IN G

FIG. 4B

METHOD AND SYSTEM FOR GRAPH BASED INTERACTIVE DETECTION OF CURVE STRUCTURES IN 2D FLUOROSCOPY

This application claims the benefit of U.S. Provisional Application No. 61/312,373, filed Mar. 10, 2010, the disclosure of which is herein incorporated by reference.

BACKGROUND OF THE INVENTION

The present invention relates to x-ray imaging, and more particularly, to detection of curve structures in 2D fluoroscopic images.

The detection of curve structures in medical imaging has many practical applications. For example, it is desirable to detect vessel branches in angiograms, and to detect guidewires and catheters in fluoroscopic images. Existing methods have been developed to automatically detect curve structures, such as guidewires and vessels. Although a fully automatic method is desirable in many cases, the existing automatic methods are prone to errors that are caused by image noise and curve-like artifacts. Some curve detection applications cannot tolerate a significant amount of error. For example, detection of a guidewire in a fluoroscopic image is challenging because guidewires are thin and typically have low visibility in fluoroscopic images, which typically have poor image quality due to the low dose of radiation used in interventional imaging. Accordingly, an accurate and robust method that utilizes expert interactions to detect curve structures in fluoroscopic images is desirable.

BRIEF SUMMARY OF THE INVENTION

The present invention provides a method and system for detecting curve structures in 2D fluoroscopic images. Embodiments of the present invention provide a graph based method for interactive detection of curve structures in fluoroscopic images.

In one embodiment of the present invention, a plurality of curve segments are detected in an image. A graph is generated based on the detected curve segments. A curve structure is detected in the image by determining a path between a source node and a destination node in the graph. In one embodiment, the path may be determined by detecting a shortest path between the source node and the destination node in the graph. In another embodiment, a hyper-graph can be constructed from the graph in order to impose geometric constraints on segments of the curve structure, and the curve structure can be detected by finding a shortest path in the hyper-graph. In yet another embodiment, an initial curve structure can be detected by finding the shortest path in the graph, nodes can be removed from the graph based on the initial detection, a hyper-graph can be constructed based on the remaining nodes of the graph, and the curve structure can be detected by finding a shortest path in the hyper-graph.

These and other advantages of the invention will be apparent to those of ordinary skill in the art by reference to the following detailed description and the accompanying drawings.

BRIEF DESCRIPTION OF THE DRAWINGS

FIG. 4A illustrates a method of detecting a curve in a fluoroscopic image using a hyper-graph according to an embodiment of the present invention;

FIG. 4B illustrates pseudo code for implementing the method of FIG. 4A;

DETAILED DESCRIPTION

The present invention relates to a method and system for detecting curve structures in a fluoroscopic image. Embodiments of the present invention are described herein to give a visual understanding of the curve structure detection method. A digital image is often composed of digital representations of one or more objects (or shapes). The digital representation of an object is often described herein in terms of identifying and manipulating the object. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention provide a graph based method for interactive detection of curve structures in a 2D fluoroscopic image. The method automatically detects curves segments in the image, which, together with user inputs, are used to construct a graph. In the graph, the nodes represent the detected curve segments and the edges represent curve connectivity. A curve structure is detected by finding the shortest path in the graph given the user inputs. In order to impose curve geometric constraints, a hyper-graph is introduced, in which the geometric constraints can be imposed as an inherent property. Embodiments of the present invention integrate the automatically detected curve segments, user interactions, and generic geometric constraints into one framework and provide a smooth detection result that quickly converges. Embodiments of the present invention can be used to detect various curve structures including, but not limited to, guidewires, vessels, and catheters, in 2D fluoroscopic images.

Figure 1:
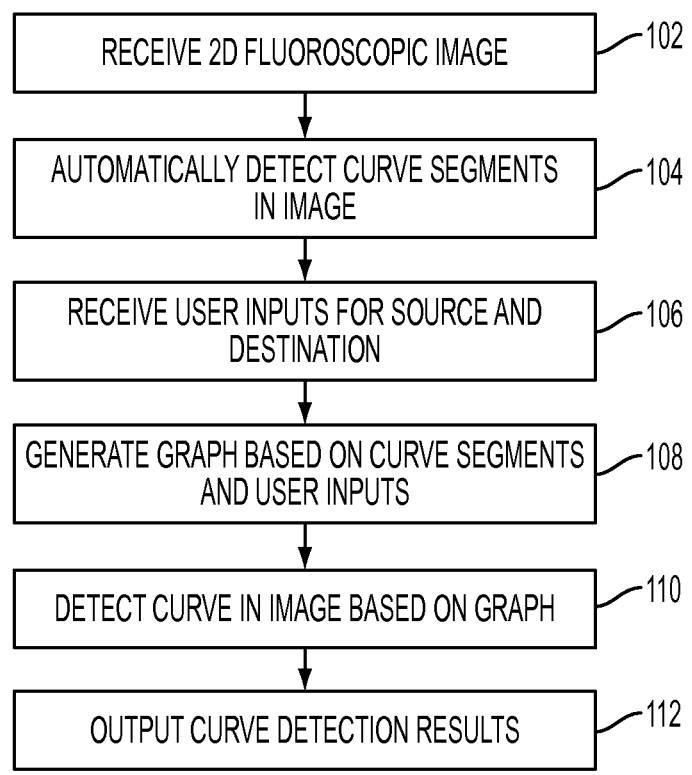
FIG. 1 illustrates a method for detecting curve structures in an image according to an embodiment of the present invention.
Figures 2A, 2B, 2C, 2D:
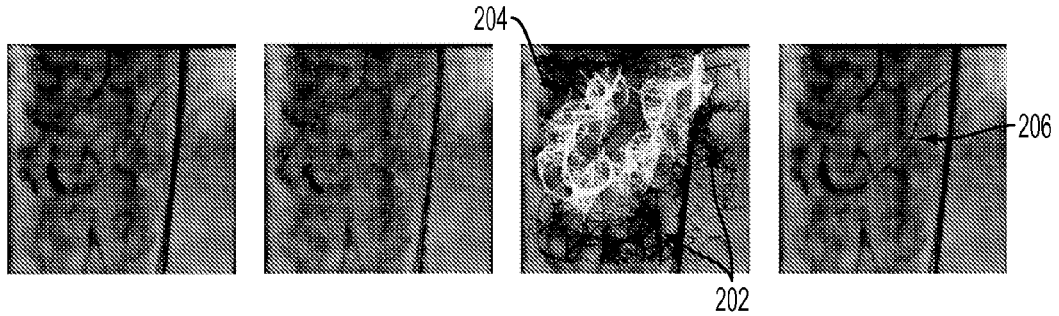
FIG. 2 illustrates exemplary results of the steps of the method of FIG. 1.

FIG. 1 illustrates a method for detecting curve structures in an image according to an embodiment of the present invention. The method of FIG. 1 transforms image data in order to detect a curved shaped structure in the image data. The method of FIG. 1 can be used to detect various curve structures, such as guidewires, vessels, and catheters in 2D fluoroscopic images. As illustrated in FIG. 1, at step 102, a 2D fluoroscopic image is received. For example, the fluoroscopic image can be received from an x-ray imaging device as the fluoroscopic image is captured by the x-ray imaging device. It is also possible that the fluoroscopic image is received by loading a previously generated fluoroscopic image from a computer readable medium, or memory or storage of a computer system. The fluoroscopic image may be a frame of a fluoroscopic image sequence. According to the type of curve structure that is being detected (e.g., guidewire, vessel, etc.), the fluoroscopic image may be a contrast enhance fluoroscopic image. For example, when a vessel structure is being detected, a contrast enhanced 2D fluoroscopic image is received. FIG. 2 illustrates exemplary results of the steps of the method of FIG. 1. As illustrated in FIG. 2, image (a) shows a 2D fluoroscopic image.

Returning to FIG. 1, at step 104, curve segments are automatically detected in the 2D fluoroscopic image. According to an advantageous implementation, a hierarchical learning based method can be used to detect curve segments in the 2D fluoroscopic image. The curve segment detection can be performed in two stages: first, detection of piece-wise curve segments, and second, detection of pair-wise connections between pairs of curve segments.

In the first stage, a piece-wise curve segment detector detects individual segments of curves, each a short line segment with a constant length. Such a curve segment has three parameters $(x, y, \theta)$, where $(x, y)$ is the segment center location and $\theta \in [-90, 90]$ is the curve segment orientation. The piece-wise curve segment detector is a learning based detector that is trained offline from annotated training data. All points on the annotated curves in the training data can be considered positive training samples, while negative samples can be randomly obtained from regions other than the annotated curve structures. The piece-wise curve detector can be trained as a probabilistic boosting tree (PBT) classifier using Haar features. To detect curve segments of different orientations, the image is rotated at a number of discrete angles to search the rotations angles of curve segments. Image (b) of FIG. 2 show curve segments detected in the 2D fluoroscopic image of image (a) using the piece-wise curve segment detector.

In the second stage, since the piece-wise detector may produce false positives, a pair-wise curve segment detector is used to prune false detections. In the pair-wise curve segment detection, every pair of two detected curve segments are classified with a probability score corresponding to the probability that they belong to a curve, based on the image intensity and geometric features. Such geometric features include the center distance and angle difference between the two segments. Similar to the piece-wise curve segment detector, the pair-wise curve segment detector is trained based on annotated training data using a PBT classifier. The probabilistic output from the pair-wise curve segment detector, denoted as $p_{ij}$, quantifies the connectivity between the i-th and j-th detected curve segments.

At step 106, user inputs for a source and a destination on the curve are received. For example, the fluoroscopic image can be displayed on a display device of a computer system and a user can input end points of the curve using a user input device, such as a mouse. The two endpoints of the curve correspond to a source node and a destination node in a graph used to detect the curve. The source and destination nodes can be specified by two user clicks of a mouse, e.g., the first user click as the source node and the second as the destination node. Each user click creates a new curve segment, whose position is defined by the user click, and whose orientation is interpolated from neighboring detected segments using an extension field. The source and destination segments generated from the user inputs are then used to construct a graph and to determine a shortest path between the source and destination.

Figure 3A:
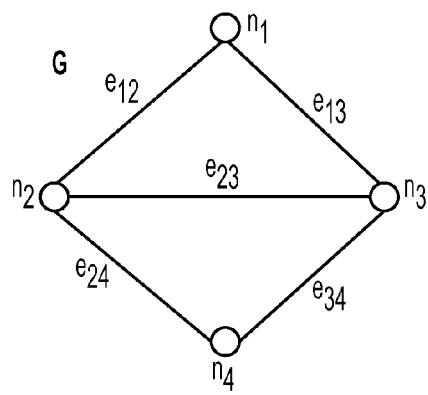
FIG. 3A illustrates an exemplary graph representation for curve detection according to an embodiment of the present invention.

At step 108, a graph is generated based on the detected curve segments and the user inputs. The graph is used to organize all the detected curve segments and the curve structure is then formalized as an optimization problem based on the graph. The graph includes nodes and edges connecting the nodes. Each node in the graph represents a detected curve segment and each edge between two nodes represents a possible connection between the two curve segments represented by the nodes. The source node and the destination node correspond to the curve segments received as user inputs. FIG. 3A illustrates an exemplary graph representation for curve detection according to an embodiment of the present invention. As shown in graph G of FIG. 3A, the node representing the k-th segment can be denoted as $n_k$, and the edge for the detected connection between the i-th and the j-th node can be denoted as $e_{ij}$. Each edge $e_{ij}$ is associated with a cost $c_{ij}$. According to a possible implementation, the cost $c_k$ of the node $n_k$ can be ignored, because the probability of each segment is already included in the edge cost $c_{ij}$.

The edge cost $c_{ij}$ is defined by the probabilistic output $p_{ij}$ of the pair-wise detector, because $p_{ij}$ quantifies the connection between two nodes. In particular, the cost of an edge may be defined as:

$$c_{ij} = -\log(p_{ij}). \tag{1}$$

By this definition, the higher the probability is of a connection between the two nodes, the lower the cost is. Such a definition allows for formalizing the interactive detection as an optimization problem, which can be expressed as:

$$\Gamma = \underset{L}{\operatorname{argmin}} \sum_{(i,j) \in L} c_{ij} = \underset{L}{\operatorname{argmax}} \sum_{(i,j) \in L} \log(p_{ij}), \tag{2}$$

where $\Gamma$ is the detected curve, and L is a valid path in the graph.

Returning to FIG. 1, at step 110, the curve is detected in the fluoroscopic image based on the graph. In one embodiment, the curve can be detected using the optimization problem expressed in Equation (2) to find the best path in the graph, given the edge cost defined in Equation (1). Given two endpoints on the curve via the user input, one as the source node and the other as the destination node, a shortest path algorithm can be used to determine the shortest path in the graph. According to an advantageous implementation, Dijkstra's algorithm, which is a well-known shortest path algorithm, can be used to determine the shortest path in the graph, resulting in the detected curve in the fluoroscopic image.

According to another embodiment of the present invention, the curve can be detected in the fluoroscopic image using a "hyper-graph" generated based on the original graph. The graph optimization described above provides an effective framework for interactive curve detection, but the best path solution obtained using Equation (2) only involves the minimization of costs based on the classification scores from the pair-wise segment detector. Geometric properties of the curve, such as curve smoothness, are not taken into consideration when solving the shortest path of the graph. Without geometric constraints, the curve detection can be more easily affected by false curve segment detections, which may result in inaccurate results. Such curve smoothness constraints are difficult to incorporated into existing graph optimization algorithms, such as Dijkstra's algorithm, because the geometric constraints mean that the detection is no longer a shortest path problem in the original graph. To address this issue, an embodiment of the present invention extends an original graph into a hyper-graph which can accommodate geometric constraints in the detection framework.

Figure 3B:
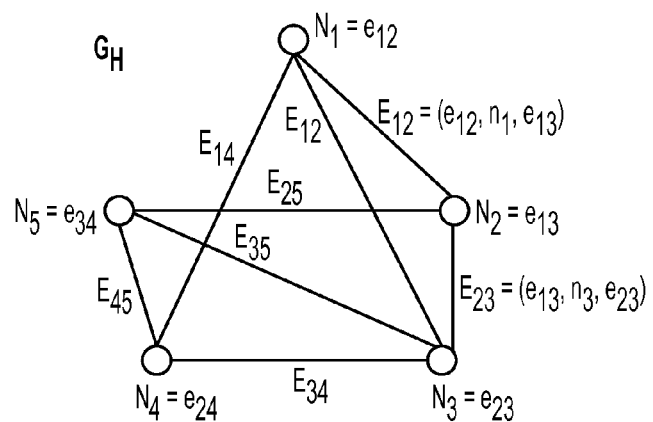
FIG. 3B illustrates an exemplary hyper-graph constructed based on the graph of FIG. 3A.

FIG. 4A illustrates a method of detecting a curve in a fluoroscopic image using a hyper-graph according to an embodiment of the present invention. The method of FIG. 4A can be used to implement step 110 of FIG. 1. FIG. 4B illustrates pseudo code for implementing the method of FIG. 4A. At step 402, a hyper-graph is constructed based on an original graph. This step is shown at 452 of FIG. 4B. The hyper-graph is constructed based on the original graph generated at step 108 of FIG. 1. The basic idea of constructing a hyper-graph is to model a segment of curve path, which involves more than a pair of nodes, as a hyper-edge (i.e., an edge in the hyper-graph, denoted as $E_{ij}$) and also to model each edge in the original graph as a hyper-node (i.e., a node in the hyper-graph, denoted as $N_k$). FIG. 3B shows an example of a hyper-graph $G_H$ constructed based on the original graph G of FIG. 3A. As shown in FIGS. 3A and 3B, each hyper-node $N_i$ in $G_H$ is transformed from one of the edges $e_{jk}$ of the original graph G, and each hyper-edge $E_{ij}$ in $G_H$ is transformed from a path ($e_{mn} \rightarrow n_m \rightarrow e_{ml}$) in G, where j, k, m, n, and l are indices. In other words, each edge in the original graph G is set as a hyper-node in the hyper-graph $G_H$, and a pair of hype-nodes is connected with a hyper-edge in the hyper graph $G_H$ if the corresponding edges share a node in the original graph G.

In the hyper-graph, the node cost of each hyper-node is set to be the edge cost of the corresponding edge in the original graph, i.e., $C_{N_k} = c_{ij}$ if $N_k$ corresponds to $e_{ij}$. Since each hyper-edge corresponds to part of a path on a curve, the cost of hyper-edge can be defined to impose geometric constraints. According to an advantageous implementation, two types of geometric constraints, shortness and smoothness, can be used to define the edge cost in the hyper-graph. This edge cost can be expressed as:

$$C_{E_{ij}} = \alpha(1 + \cos(\angle(E_{ij}))) + \beta \log\left(\frac{1}{1 + \exp(-|E_{ij}|/B)}\right), \quad (3)$$

where $L\angle(E_{ij})$ is the angle at the center of the curve path that corresponds to the hyper-edge $E_{ij}$, and $|E_{ij}|$ is the arc length of the curve path that corresponds to the hyper edge $E_{ij}$. The first term $1 + \cos(\angle(E_{ij}))$ imposes a non-negative smoothness measurement as a constraint of the curve path, and the second term $$\log\left(\frac{1}{1 + \exp(-|E_{ij}|/B)}\right)$$

favors a shorter curve path. The parameters α and β are used to weight the two types of geometric constraints, and the parameter B is a parameter in the sigmoid function. These parameters may be set empirically.

Returning to FIG. 4A, at step 404, multiple shortest paths are detected in the hyper-graph corresponding to multiple edges connected to the source node in the original graph. This step is shown at 454 of FIG. 4B. Given the constructed hyper-graph and the redefined costs on the edges and nodes of the hyper-graph, a graph shortest path algorithm can be used to find the optimal curve, based on the criteria from both pair-wise connectivity and geometric constraints. This can be expressed as an optimization problem:

$$\Gamma = \underset{L}{\operatorname{argmin}} \sum_{N_k \in L \,\&\, E_{ij} \in L} C_{N_K} + C_{E_{ij}}. \quad (4)$$

The single-shortest path algorithm needs to be run multiple times to find a bundle of shortest paths in the hyper-graph, because a source node in the original graph corresponds to multiple edges in the hyper-graph. The source node $n_s$ is connected to multiple edges $e_{i,s}$ in the original graph G. Each of those edges $e_{i,s}$ corresponds to a hyper-node in the hyper-graph $G_H$. Similarly, the destination node $n_d$ is connected to multiple edges $e_{j,d}$ in the original graph G, and each of those edges $e_{j,d}$ corresponds to a hyper-node in the hyper-graph $G_H$. Accordingly, for each hyper-node corresponding to one of the edges connected to the source node in the original graph, a shortest path is determined between that hyper-node and one of the hyper-nodes corresponding to edges $e_{j,d}$ connected to the destination in the original graph.

Referring to FIG. 4A, at step 406, the curve is detected in the fluoroscopic image by selecting one of the multiple detected shortest paths. This step is shown at 456 of FIG. 4B. Once the shortest path is detected in the hyper-graph for each of the hyper-nodes corresponding to an edge connected to the source node in the original graph, the optimal curve with the least cost is selected as the final detection result. The shortest path in the hyper-graph is then mapped back to a path in the original graph to define the curve in the 2D fluoroscopic image.

Figure 5:
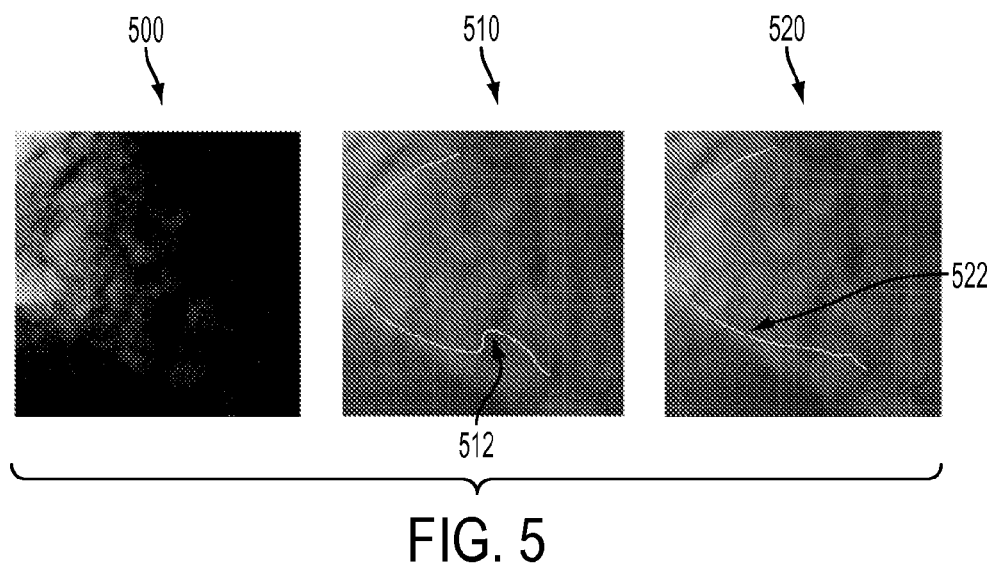
FIG. 5 illustrates exemplary curve detection results using a hyper-graph.

FIG. 5 illustrates exemplary curve detection results using a hyper-graph. As illustrated in FIG. 5, image 500 is a 2D fluoroscopic image, image 510 shows a curve structure 512 detected in the 2D fluoroscopic image by finding the shortest path on the original graph generated at step 108, and image 520 shows a curve structure 522 detected in the 2D fluoroscopic image using a hyper-graph according to the method of FIGS. 4A and 4B. The curve structure 512 detected using only the original graph is adversely affected by false curve segment detections, while the curve structure 514 detected using a hyper-graph to impose geometric constraints is more accurate.

According to another embodiment of the present invention, the curve can be detected in the fluoroscopic image using the original graph and a hyper-graph in a two-stage method. When constructing a hyper-graph from an original graph, the size of the hyper-graph grows linearly with the number of edges and nodes in the original graph. With the increased graph size, the computation time increases dramatically. To address the issue of increased computation time, a two-stage method in which the original graph and a hyper-graph are applied sequentially can be utilized.

Figure 6:
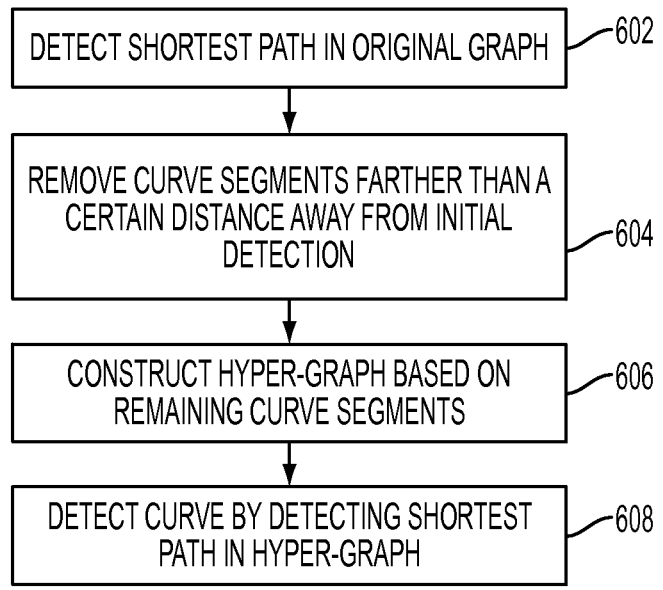
FIG. 6 illustrates a method of detecting a curve in a fluoroscopic image using an original graph and a hyper-graph according to an embodiment of the present invention.

FIG. 6 illustrates a method of detecting a curve in a fluoroscopic image using an original graph and a hyper-graph according to an embodiment of the present invention. The method of FIG. 6 can be used to implement step 110 of FIG. 1. As illustrated in FIG. 6, at step 602, the shortest path is detected in the original graph. An initial curve corresponding to the shortest path in the original graph (generated at step 108 of FIG. 1) can be detected using a shortest path algorithm, such as Dijkstra's algorithm. At step 604, curve segments greater than a certain distance away from the initial detection in the 2D fluoroscopic image are removed. At step 606, a hyper-graph is constructed based on the remaining curve segments (nodes) in the original graph. The hyper-graph is constructed as described above in the method of FIGS. 4A and 4B. At step 608, the curve is detected in the 2D fluoroscopic image by detecting the shortest path in the hyper-graph. The shortest path in the hyper-graph is detected as described above in the method of FIGS. 4A and 4B.

Referring to FIG. 2, images (c) and (d) show exemplary results of the two-stage detection method of FIG. 6. Image (c) of FIG. 2 shows curve segments 202 corresponding to an original graph and curve segments 204, which are a subset of the curve segments 202, corresponding to the curve segments remaining after an initial curve detection using the original graph. Image (d) of FIG. 2 shows a guidewire 206 detected using a hyper-graph constructed based on curve segments 204.

Returning to FIG. 1, at step 112, the curve detection results are output. As described above, according to various embodiments of the present invention the curve structure can be detected in the 2D fluoroscopic image by finding the shortest path of the original graph (generated at step 108), finding the shortest path of a hyper-graph generated based on the original graph, or a two-stage method that sequentially applies the original graph and the hyper-graph. The curve structure detection results can be output by displaying the fluoroscopic image and the detected curve structure, for example, on a display device of a computer system. The curve structure detection results can also be output by storing the detection results on a memory or storage of a computer system, or a computer readable medium.

Figure 7:
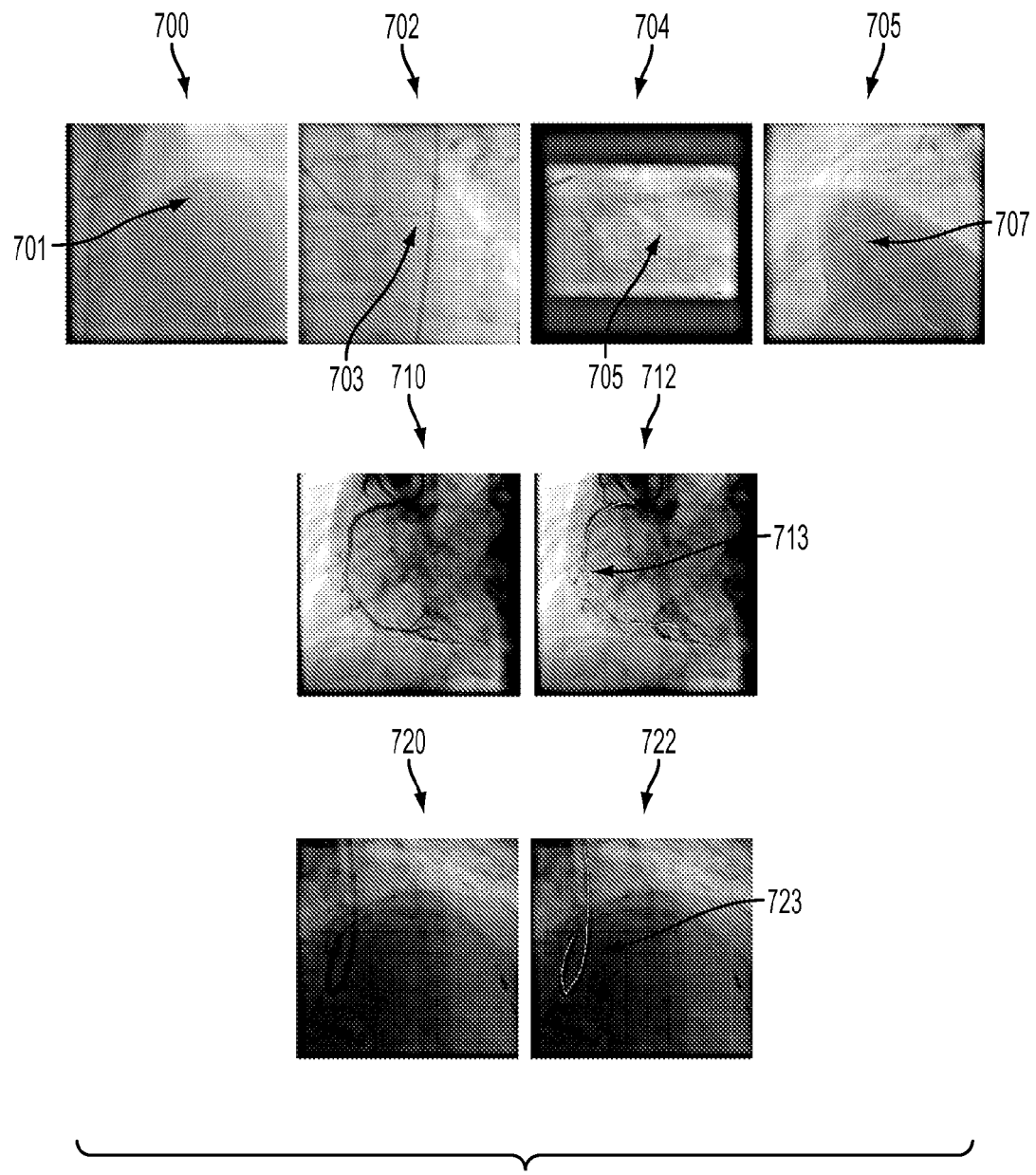
FIG. 7 illustrates exemplary curve structure detection results generated using the method of FIG. 1.

FIG. 7 illustrates exemplary curve structure detection results generated using the method of FIG. 1. Images 700, 702, 704, and 706 show detected guidewires 701, 703, 705, and 707, respectively. Image 710 is a fluoroscopic image with a vessel branch in it, and image 712 shows an interactive detection result 713 of the vessel branch. Image 720 is a fluoroscopic image with a guiding catheter in it, and image 722 shows an interactive detection result 723 of the guiding catheter.

As described above, the method of FIG. 1 utilizes user inputs for source and destination nodes to detect a curve structure. According to an embodiment of the present invention, additional user input may be received and used to improve the interactive detection result. The additional user inputs can be used to generate new curve segments which are added to the graph. For example, after a detection result is output, the user may input additional clicks indicating locations of the curve in the image. The additional user clicks can be added to the graph and the detection performed again to improve the results. This process can be repeated until a satisfactory result is obtained.

As described above in the methods of FIGS. 4A, 4B, and 6, a hyper-graph can be constructed based on an original graph. It is to be understood that the present invention is not limited to a single hyper-graph, and may be extended to one or more higher order hyper-graphs constructed based on the hyper-graph. For example, such higher order hyper-graphs can be used to apply geometric constraints on 3 or more edges of the original graph.

Figure 8:
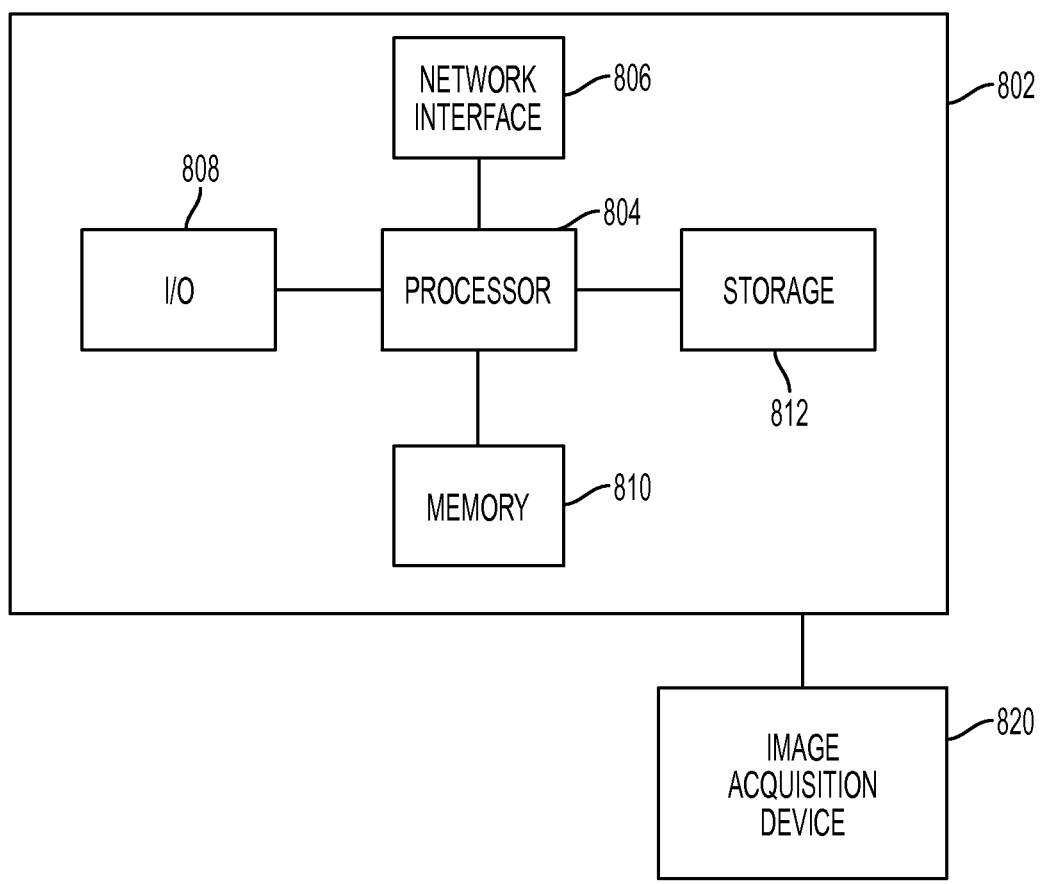
FIG. 8 is a high level block diagram of a computer capable of implementing the present invention.

The above-described methods for curve structure detection in a fluoroscopic image may be implemented on a computer using well-known computer processors, memory units, storage devices, computer software, and other components. A high level block diagram of such a computer is illustrated in FIG. 8. Computer 802 contains a processor 804 which controls the overall operation of the computer 802 by executing computer program instructions which define such operation. The computer program instructions may be stored in a storage device 812, or other computer readable medium, (e.g., magnetic disk) and loaded into memory 810 when execution of the computer program instructions is desired. Thus, all method steps described above, including the method steps illustrated in FIGS. 1, 4A, 4B, and 6, may be defined by the computer program instructions stored in the memory 810 and/or storage 812 and controlled by the processor 804 executing the computer program instructions. An image acquisition device 820, such as an X-ray imaging device, can be connected to the computer 802 to input fluoroscopic image sequences to the computer 802. It is possible to implement the image acquisition device 820 and the computer 802 as one device. It is also possible that the image acquisition device 820 and the computer 802 communicate wirelessly through a network. The computer 802 also includes one or more network interfaces 806 for communicating with other devices via a network. The computer 802 also includes other input/output devices 808 that enable user interaction with the computer 802 (e.g., display, keyboard, mouse, speakers, buttons, etc.) One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for detecting a curve structure in an image, comprising:
   detecting a plurality of curve segments in the image;
   generating a graph based on the curve segments, wherein the graph comprises a plurality of nodes, including a respective node corresponding to each of the plurality of curve segments detected in the image, and a plurality of edges connecting the plurality of nodes, wherein each node of the plurality of nodes is connected by respective edges to multiple other nodes of the plurality of nodes and each edge represents a possible connection between the curve segments corresponding to the nodes connected by the edge; and
   detecting a curve structure in the image by determining a path from a source node to a destination node in the graph.

2. The method of claim 1, wherein the step of detecting a plurality of curve segments in the image comprises:
   detecting piece-wise curve segments in the image using a trained piece-wise curve segment detector; and
   detecting pair-wise probabilities of pairs of the piece-wise curve segments using a trained pair-wise curve segment detector, wherein the pair-wise probability of each pair of the piece-wise curve segments quantifies a probability of a connection between the pair of piece-wise curve segments.

3. The method of claim 2, wherein the step of generating a graph based on the curve segments comprises:
   associating an edge cost with each edge of the graph based on the pair-wise probability detected between the curve segments corresponding to the nodes connected by each edge.

4. The method of claim 1, wherein the step of generating a graph based on the curve segments comprises:
   generating the source node and the destination node of the graph based on user inputs.

5. The method of claim 3, wherein the step of detecting a curve structure in the image comprises:

detecting a shortest path in the graph based on the edge costs associated with the edges in the graph.

6. The method of claim 1, wherein the step of detecting a curve structure in the image comprises:
   constructing a hyper-graph based on the graph, wherein the hyper-graph comprises a plurality of hyper-nodes, each corresponding to an edge in the graph, and a plurality of hyper-edges connecting hyper-nodes that correspond to edges that share a node in the graph; and
   detecting a shortest path from a first hyper-node corresponding to an edge connected to the source node in the graph to a second hyper-node corresponding to an edge connected to the destination node in the graph, based on hyper-node costs and hyper-edge costs in the hyper-graph.

7. The method of claim 6, wherein the step of constructing a hyper-graph based on the graph comprises:
   associating each hyper-node in the hyper-graph with a hyper-node cost corresponding to an edge cost of the corresponding edge in the graph; and
   associating each hyper-edge in the hyper-graph with a hyper-edge cost that imposes geometric constraints on a curve path represented by each hyper-edge.

8. The method of claim 7, wherein the step of associating each hyper-edge in the hyper-graph with a hyper-edge cost that imposes geometric constraints on a curve path represented by each hyper-edge comprises:
   associating each hyper-edge with a hyper-edge cost that imposes a smoothness constraint and a shortness constraint on the curve path represented by each hyper-edge.

9. The method of claim 6, wherein the step of detecting a shortest path from a first hyper-node corresponding to an edge connected to the source node in the graph to a second hyper-node corresponding to an edge connected to the destination node in the graph, based on hyper-node costs and hyper-edge costs in the hyper-graph comprises:
   detecting a plurality of shortest paths in the hyper-graph, each from a respective one of a plurality of hyper-nodes corresponding to a plurality of edges connected to the source node in the graph to one of a plurality of hyper-nodes corresponding to a plurality of edges connected to the destination node in the graph; and
   selecting one of the plurality of shortest paths with the lowest cost.

10. The method of claim 6, wherein the step of detecting a curve structure in the image further comprises:
    mapping the detected shortest path in the hyper-graph to a path in the graph.

11. The method of claim 1, wherein the step of detecting a curve structure in the image comprises:
    detecting an initial curve structure in the image by detecting a shortest path in the graph based on edge costs of the edges in the graph;
    removing nodes from the graph corresponding to curve segments greater than a certain distance from the initial curve structure in the image;
    constructing a hyper-graph based on the remaining nodes in the graph, wherein the hyper-graph comprises a plurality of hyper-nodes, each corresponding to an edge in the graph, and a plurality of hyper-edges connecting hyper-nodes that correspond to edges that share a node in the graph; and
    detecting the curve structure by detecting a shortest path in the hyper-graph based on hyper-node costs and hyper-edge costs.

12. An apparatus for detecting a curve structure in an image, comprising:
    a processor; and
    a memory storing computer program instructions, which when executed by the processor cause the processor to perform operations comprising:
      detecting a plurality of curve segments in the image;
      generating a graph based on the curve segments, wherein the graph comprises a plurality of nodes, including a respective node corresponding to each of the plurality of curve segments detected in the image, and a plurality of edges connecting the plurality of nodes, wherein each node of the plurality of nodes is connected by respective edges to multiple other nodes of the plurality of nodes and each edge represents a possible connection between the curve segments corresponding to the nodes connected by the edge; and
      detecting a curve structure in the image by determining a path from a source node to a destination node in the graph.

13. The apparatus of claim 12, wherein detecting a plurality of curve segments in the image comprises:
    detecting piece-wise curve segments in the image using a trained piece-wise curve segment detector; and
    detecting pair-wise probabilities of pairs of the piece-wise curve segments using a trained pair-wise curve segment detector, wherein the pair-wise probability of each pair of the piece-wise curve segments quantifies a probability of a connection between the pair of piece-wise curve segments.

14. The apparatus of claim 13, wherein generating a graph based on the curve segments comprises:
    associating an edge cost with each edge of the graph based on the pair-wise probability detected between the curve segments corresponding to the nodes connected by each edge.

15. The apparatus of claim 12, wherein generating a graph based on the curve segments comprises:
    generating the source node and the destination node of the graph based on user inputs.

16. The apparatus of claim 14, wherein detecting a curve structure in the image comprises:
    detecting a shortest path in the graph based on the edge costs associated with the edges in the graph.

17. The apparatus of claim 12, wherein detecting a curve structure in the image comprises:
    constructing a hyper-graph based on the graph, wherein the hyper-graph comprises a plurality of hyper-nodes, each corresponding to an edge in the graph, and a plurality of hyper-edges connecting hyper-nodes that correspond to edges that share a node in the graph; and
    detecting a shortest path from a first hyper-node corresponding to an edge connected to the source node in the graph to a second hyper-node corresponding to an edge connected to the destination node in the graph, based on hyper-node costs and hyper-edge costs in the hyper-graph.

18. The apparatus of claim 17, wherein constructing a hyper-graph based on the graph comprises:
    associating each hyper-node in the hyper-graph with a hyper-node cost corresponding to an edge cost of the corresponding edge in the graph; and
    associating each hyper-edge in the hyper-graph with a hyper-edge cost that imposes geometric constraints on a curve path represented by each hyper-edge.

19. The apparatus of claim 17, wherein detecting a shortest path from a first hyper-node corresponding to an edge connected to the source node in the graph to a second hyper-node corresponding to an edge connected to the destination node in the graph, based on hyper-node costs and hyper-edge costs in the hyper-graph comprises:
  detecting a plurality of shortest paths in the hyper-graph, each from a respective one of a plurality of hyper-nodes corresponding to a plurality of edges connected to the source node in the graph to one of a plurality of hyper-nodes corresponding to a plurality of edges connected to the destination node in the graph; and
  selecting one of the plurality of shortest paths with the lowest cost.

20. The apparatus of claim 12, wherein detecting a curve structure in the image comprises:
  detecting an initial curve structure in the image by detecting a shortest path in the graph based on edge costs of the edges in the graph;
  removing nodes from the graph corresponding to curve segments greater than a certain distance from the initial curve structure in the image;
  constructing a hyper-graph based on the remaining nodes in the graph, wherein the hyper-graph comprises a plurality of hyper-nodes, each corresponding to an edge in the graph, and a plurality of hyper-edges connecting hyper-nodes that correspond to edges that share a node in the graph; and
  detecting the curve structure by detecting a shortest path in the hyper-graph based on hyper-node costs and hyper-edge costs.

21. A non-transitory computer readable medium encode with computer executable instructions for detecting a curve structure in an image, the computer executable instructions defining steps comprising:
  detecting a plurality of curve segments in the image;
  generating a graph based on the curve segments, wherein the graph comprises a plurality of nodes, including a respective node corresponding to each of the plurality of curve segments detected in the image, and a plurality of edges connecting the plurality of nodes, wherein each node of the plurality of nodes is connected by respective edges to multiple other nodes of the plurality of nodes and each edge represents a possible connection between the curve segments corresponding to the nodes connected by the edge; and
  detecting a curve structure in the image by determining a path from a source node to a destination node in the graph.

22. The computer readable medium of claim 21, wherein the computer executable instructions defining the step of detecting a plurality of curve segments in the image comprise computer executable instructions defining the steps of:
  detecting piece-wise curve segments in the image using a trained piece-wise curve segment detector; and
  detecting pair-wise probabilities of pairs of the piece-wise curve segments using a trained pair-wise curve segment detector, wherein the pair-wise probability of each pair of the piece-wise curve segments quantifies a probability of a connection between the pair of piece-wise curve segments.

23. The computer readable medium of claim 22, wherein the computer executable instructions defining the step of generating a graph based on the curve segments comprise computer executable instructions defining the step of:
  associating an edge cost with each edge of the graph based on the pair-wise probability detected between the curve segments corresponding to the nodes connected by each edge.

24. The computer readable medium of claim 21, wherein the computer executable instructions defining the step of generating a graph based on the curve segments comprise computer executable instructions defining the step of:
  generating the source node and the destination node of the graph based on user inputs.

25. The computer readable medium of claim 23, wherein the computer executable instructions defining the step of detecting a curve structure in the image comprise computer executable instructions defining the step of:
  detecting a shortest path in the graph based on the edge costs associated with the edges in the graph.

26. The computer readable medium of claim 21, wherein the computer executable instructions defining the step of detecting a curve structure in the image comprise computer executable instructions defining the steps of:
  constructing a hyper-graph based on the graph, wherein the hyper-graph comprises a plurality of hyper-nodes, each corresponding to an edge in the graph, and a plurality of hyper-edges connecting hyper-nodes that correspond to edges that share a node in the graph; and
  detecting a shortest path from a first hyper-node corresponding to an edge connected to the source node in the graph to a second hyper-node corresponding to an edge connected to the destination node in the graph, based on hyper-node costs and hyper-edge costs in the hyper-graph.

27. The computer readable medium of claim 26, wherein the computer executable instructions defining the step of constructing a hyper-graph based on the graph comprise computer executable instructions defining the steps of:
  associating each hyper-node in the hyper-graph with a hyper-node cost corresponding to an edge cost of the corresponding edge in the graph; and
  associating each hyper-edge in the hyper-graph with a hyper-edge cost that imposes geometric constraints on a curve path represented by each hyper-edge.

28. The computer readable medium of claim 26, wherein the computer executable instructions defining the step of detecting a shortest path from a first hyper-node corresponding to an edge connected to the source node in the graph to a second hyper-node corresponding to an edge connected to the destination node in the graph, based on hyper-node costs and hyper-edge costs in the hyper-graph comprise computer executable instructions defining the steps of:
  detecting a plurality of shortest paths in the hyper-graph, each from a respective one of a plurality of hyper-nodes corresponding to a plurality of edges connected to the source node in the graph to one of a plurality of hyper-nodes corresponding to a plurality of edges connected to the destination node in the graph; and
  selecting one of the plurality of shortest paths with the lowest cost.

29. The computer readable medium of claim 21, wherein the computer executable instructions defining the step of detecting a curve structure in the image comprise computer executable instructions defining the steps of:
  detecting an initial curve structure in the image by detecting a shortest path in the graph based on edge costs of the edges in the graph;
  removing nodes from the graph corresponding to curve segments greater than a certain distance from the initial curve structure in the image;
  constructing a hyper-graph based on the remaining nodes in the graph, wherein the hyper-graph comprises a plurality of hyper-nodes, each corresponding to an edge in the graph, and a plurality of hyper-edges connecting hyper-nodes that correspond to edges that share a node in the graph; and detecting the curve structure by detecting a shortest path in the hyper-graph based on hyper-node costs and hyper-edge costs.

* * * * *